(12) United States Patent
Tseng et al.

(10) Patent No.: US 10,209,784 B2
(45) Date of Patent: Feb. 19, 2019

(54) COMBINATION TYPE MOUSE

(71) Applicant: Primax Electronics Ltd., Taipei (TW)

(72) Inventors: Ying-Che Tseng, Taipei (TW); Cheng-Yi Tsai, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 15/483,400

(22) Filed: Apr. 10, 2017

(65) Prior Publication Data

US 2018/0212348 A1 Jul. 26, 2018

(30) Foreign Application Priority Data

Jan. 20, 2017 (TW) .............................. 106102163 A

(51) Int. Cl.
*G01J 1/02* (2006.01)
*G06F 3/03* (2006.01)
*G06F 3/0354* (2013.01)
*H01R 12/73* (2011.01)

(52) U.S. Cl.
CPC .......... *G06F 3/0317* (2013.01); *G01J 1/0219* (2013.01); *G06F 3/03543* (2013.01); *H01R 12/73* (2013.01)

(58) Field of Classification Search
CPC .... G06F 3/0312; G06F 3/0317; G06F 3/0321; G06F 3/0325; G06F 3/033; G06F 3/0338; G06F 3/03543; G06F 3/03544
USPC ................................................. 345/156–167
See application file for complete search history.

(56) References Cited

U.S. PATENT DOCUMENTS

| | | | | |
|---|---|---|---|---|
| 4,906,843 A | * | 3/1990 | Jones .................... | G06F 3/0312 250/221 |
| 2008/0246727 A1 | * | 10/2008 | Larsen ................ | G06F 3/03543 345/163 |
| 2010/0231514 A1 | * | 9/2010 | Min-Liang .......... | G06F 3/03543 345/163 |
| 2011/0063219 A1 | * | 3/2011 | Min-Liang .......... | G06F 3/03543 345/163 |
| 2011/0205158 A1 | * | 8/2011 | Hsu ....................... | G06F 3/0383 345/164 |
| 2015/0109208 A1 | * | 4/2015 | Wang .................. | G06F 3/03543 345/163 |
| 2015/0138093 A1 | * | 5/2015 | Young .................. | G06F 3/0312 345/166 |

(Continued)

*Primary Examiner* — Alexander Eisen
*Assistant Examiner* — Nelson Lam
(74) *Attorney, Agent, or Firm* — Muncy, Geissler, Olds & Lowe, P.C.

(57) ABSTRACT

A combination type mouse includes a supporting plate, a lower cover plate, a main circuit board, plural main connectors, an input module and a control module. The main circuit board is installed on an installation surface of the supporting plate. The plural main connectors are installed on the main circuit board and electrically connected with the main circuit board. The input module includes a first connector and a connecting recess. The first connector is electrically connected with a first main connector of the plural main connectors. The control module includes a second connector and a connecting part. The second connector is electrically connected with a second main connector of the plural main connectors. The connecting part is engaged with the connecting recess. Consequently, the components of the combination type mouse to be assembled can be determined according to the user's requirement.

12 Claims, 4 Drawing Sheets

(56) References Cited

U.S. PATENT DOCUMENTS

2016/0282969 A1\* 9/2016 Young .................. G06F 3/0312

\* cited by examiner

COMBINATION TYPE MOUSE

FIELD OF THE INVENTION

The present invention relates to a mouse, and more particularly to a combination type mouse.

BACKGROUND OF THE INVENTION

A mouse is an essential input device for a computer system. By operating the mouse to click or scroll the computer screen, the user can open a document file or other work file from the computer screen in order to read documents or web pages.

Conventionally, a mouse comprises a casing, two buttons, a scroll wheel, a circuit board, a button sensor, an encoder, a controller, an optical sensor and a power-providing element. The two buttons are installed on the casing and connected with the button sensor. The scroll wheel is installed on the casing, arranged between the two buttons, and connected with the encoder. The circuit board, the button sensor, the encoder, the controller, the optical sensor and the power-providing element are disposed within the casing. Moreover, the button sensor, the encoder, the controller, the optical sensor and the power-providing element are electrically connected with the circuit board.

As mentioned above, the two buttons and the scroll wheel are fixed on the casing, and the circuit board, the button sensor, the encoder, the controller, the optical sensor and the power-providing element are disposed within the casing. However, the conventional mouse still has some drawbacks. For example, the positions of the two buttons and the scroll wheel of the conventional mouse cannot be determined according to the preference or the use habit of the user. Moreover, the conventional mouse cannot be equipped with any other expansion module.

SUMMARY OF THE INVENTION

The present invention provides a combination type mouse. The components of the combination type mouse to be assembled can be determined according to the user's requirement.

In accordance with an aspect of the present invention, there is provided a combination type mouse. The combination type mouse includes a supporting plate, a main circuit board, plural main connectors, an input module and a control module. The supporting plate has an installation surface. The installation surface is located at a top side of the supporting plate. The main circuit board is installed on the installation surface. The plural main connectors are disposed on the main circuit board and electrically connected with the main circuit board. The input module includes a first connector and a connecting recess. The first connector is electrically connected with a first main connector of the plural main connectors. The control module includes a second connector and a connecting part. The second connector is electrically connected with a second main connector of the plural main connectors. The connecting part is connected with the connecting recess. After the input module receives an input signal, the input signal is transmitted from the input module to the main circuit board through the first connector and the first main connector, and the input signal is further transmitted from the main circuit board to the control module through the second main connector and the second connector.

In an embodiment, the combination type mouse further includes a lower cover plate. A bottom side of the supporting plate has a connection surface. The lower cover plate is connected with the connection surface of the supporting plate.

In an embodiment, the input module includes a first shell. The connecting recess is formed in a surface of the first shell. The first connector is disposed within the first shell. The first connector includes a first insertion terminal. The first insertion terminal is inserted into and electrically connected with the first main connector. Preferably, the input module further includes two buttons and a scroll wheel. The two buttons and the scroll wheel are disposed on the first shell. The scroll wheel is arranged between the two buttons. Preferably, the input module further includes a first circuit board, a button sensor and an encoder, which are disposed within the first shell. The two buttons are connected with the button sensor. The scroll wheel is connected with the encoder. The button sensor, the encoder and the first connector are electrically connected with the first circuit board. Preferably, the button sensor, the encoder and the first connector are fixed on the first circuit board. The button sensor and the encoder are located over the first circuit board. The first connector is located under the first circuit board. Consequently, the input module can be assembled with the main circuit board and the damaged input module can be replaced with a new one according to the practical requirement.

In an embodiment, the control module includes a second shell. The connecting part is protruded externally from the second shell. The second connector is disposed within the second shell. The second connector includes a second insertion terminal. The second insertion terminal is inserted into and electrically connected with the second main connector. Preferably, the control module further includes a second circuit board, a controller and an optical sensor, which are disposed within the second shell. The second connector, the controller and the optical sensor are electrically connected with the second circuit board. Preferably, the controller, the optical sensor and the second connector are fixed on the second circuit board. The controller is located over the second circuit board. The second connector is located under the second circuit board. Consequently, the control module can be assembled with the main circuit board and the damaged control module can be replaced with a new one according to the practical requirement.

In an embodiment, the combination type mouse further includes a power module. The power module includes a third shell and a third connector. The third shell is coupled with the second shell. The third connector is disposed within the third shell. The third connector includes a third insertion terminal. The third insertion terminal is inserted into and electrically connected with a third main connector of the plural main connectors. Preferably, the second shell further includes a coupling recess. The third shell includes a coupling part. The coupling part is protruded from the third shell. The coupling part is engaged with the coupling recess. Preferably, the power module further includes a third circuit board and a power-providing element, which are disposed within the third shell. The third connector and the power-providing element are electrically connected with the third circuit board. Preferably, the third connector and the power-providing element are fixed on the third circuit board. The power-providing element is located over the third circuit board. The third connector is located under the third circuit board. Consequently, the power module can be assembled with the main circuit board and the damaged power module can be replaced with a new one according to the practical requirement.

In an embodiment, the connecting part and the coupling part are protrusion blocks, the connecting recess and the coupling recess are indentations, and the protrusion blocks are engaged with the corresponding indentations. Alternatively, the connecting part and the coupling part are hooks, the connecting recess and the coupling recess are locking recesses, and the hooks are engaged with the corresponding locking recesses. Preferably, the plural main connectors, the first connector, the second connector and the third connector are micro-clip connectors.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
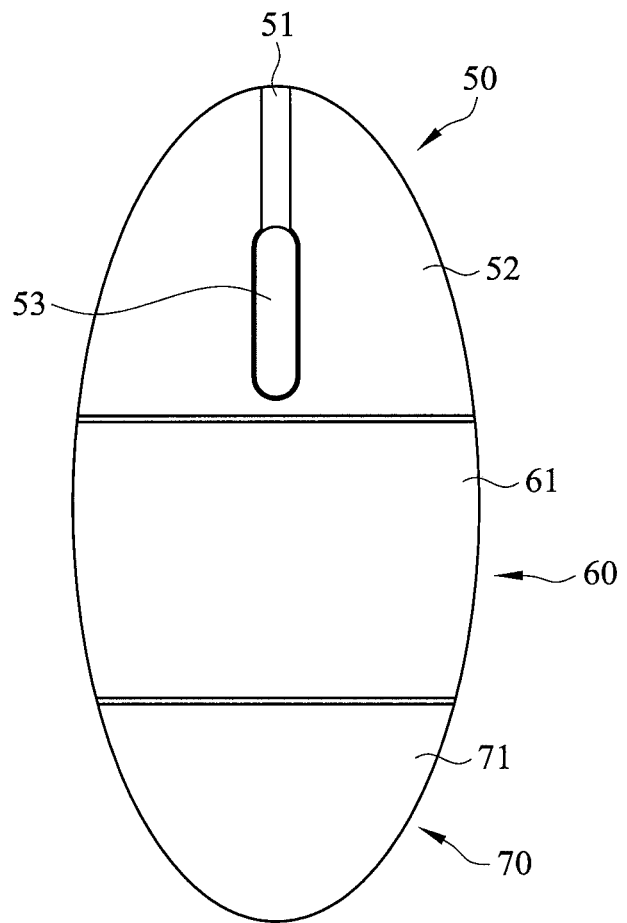
FIG. 1 is a schematic top view illustrating a combination type mouse according to a first embodiment of the present invention.
Figure 2:
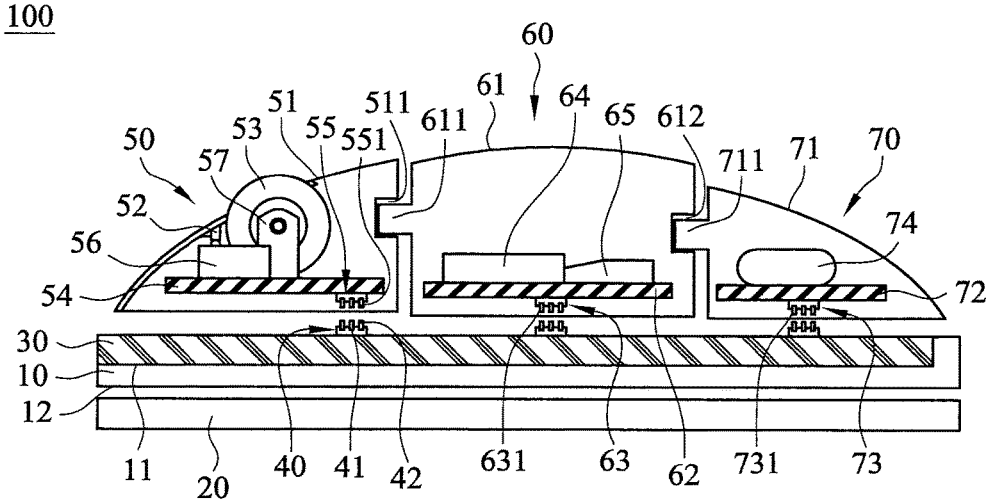
FIG. 2 is a schematic cross-sectional view illustrating the combination type mouse according to the first embodiment of the present invention.

FIG. 1 is a schematic top view illustrating a combination type mouse according to a first embodiment of the present invention. FIG. 2 is a schematic cross-sectional view illustrating the combination type mouse according to the first embodiment of the present invention. As shown in FIGS. 1 and 2, the combination type mouse 100 comprises a supporting plate 10, a lower cover plate 20, a main circuit board 30, plural main connectors 40, an input module 50, a control module 60 and a power module 70.

The supporting plate 10 has an installation surface 11 and a connection surface 12. The installation surface 11 is located at a top side of the supporting plate 10. The connection surface 12 is located at a bottom side of the supporting plate 10. The lower cover plate 20 is connected with the connection surface 12 of the supporting plate 10. In addition, the supporting plate 10 is covered by the lower cover plate 20.

The main circuit board 30 is installed on the installation surface 11 of the supporting plate 10. Each main connector 40 comprises a fixing part 41 and an insertion part 42. The fixing part 41 is located at a first side of the main connector 40. The insertion part 42 is located at a second side of the main connector 40. The fixing part 41 is electrically connected with the main circuit board 30. Consequently, all of the main connectors 40 are disposed on the main circuit board 30.

The input module 50 comprises a first shell 51, two buttons 52, a scroll wheel 53, a first circuit board 54, a first connector 55, a button sensor 56 and an encoder 57. A connecting recess 511 is formed in a lateral surface of the first shell 51. For example, the connecting recess 511 is an indentation. The two buttons 52 and the scroll wheel 53 are located at an upper portion of the first shell 51. Moreover, the scroll wheel 53 is arranged between the two buttons 52. The first circuit board 54, the first connector 55, the button sensor 56 and the encoder 57 are disposed within the first shell 51. Moreover, the first connector 55, the button sensor 56 and the encoder 57 are fixed on the first circuit board 54 and electrically connected with the first circuit board 54. The button sensor 56 and the encoder 57 are located over the first circuit board 54. The first connector 55 is located under the first circuit board 54. The two buttons 52 are connected with the button sensor 56. The scroll wheel 53 is connected with the encoder 57. The first connector 55 comprises a first insertion terminal 551. The first insertion terminal 551 is coupled with and electrically connected with the insertion part 42 of the corresponding main connector 40. In an embodiment, the first connector 55 is a micro-clip connector. When the first connector 55 is coupled with the corresponding main connector 40, the input module 50 is assembled with the main circuit board 30. Consequently, the input module 50 can be assembled or replaced according to the practical requirements.

The control module 60 comprises a second shell 61, a second circuit board 62, a second connector 63, a controller 64 and an optical sensor 65. A connecting part 611 is protruded externally from a first lateral surface of the second shell 61. A coupling recess 612 is formed in a second lateral surface of the second shell 61. The connecting part 611 is engaged with the connecting recess 511 of the first shell 51. In an embodiment, the connecting part 611 is a protrusion block, and the coupling recess 612 is an indentation. The second circuit board 62, the second connector 63, the controller 64 and the optical sensor 65 are disposed within the second shell 61. The second connector 63, the controller 64 and the optical sensor 65 are fixed on the second circuit board 62 and electrically connected with the second circuit board 62. The controller 64 is located over the second circuit board 62. The second connector 63 is located under the second circuit board 62. The second connector 63 comprises a second insertion terminal 631. The second insertion terminal 631 is coupled with and electrically connected with the insertion part 42 of the corresponding main connector 40. In an embodiment, the second connector 63 is a micro-clip connector. When the second connector 63 is coupled with the corresponding main connector 40 and the connecting part 611 is embedded within the connecting recess 511 of the first shell 51, the first shell 51 and the second shell 61 are combined together and the control module 60 is assembled with the main circuit board 30. Consequently, the control module 60 can be assembled or replaced according to the practical requirements.

The power module 70 comprises a third shell 71, a third circuit board 72, a third connector 73 and a power-providing element 74. A coupling part 711 is protruded from a lateral surface of the third shell 71. The coupling part 711 is engaged with the coupling recess 612 of the second shell 61. In an embodiment, the coupling part 711 is a protrusion block. The third circuit board 72, the third connector 73 and the power-providing element 74 are disposed within the third shell 71. The third connector 73 and the power-providing element 74 are fixed on the third circuit board 72 and electrically connected with the third circuit board 72. The power-providing element 74 is located over the third circuit board 72. The third connector 73 is located under the third circuit board 72. The third connector 73 comprises a third insertion terminal 731. The third insertion terminal 731 is coupled with and electrically connected with the insertion part 42 of the corresponding main connector 40. When the third connector 73 is coupled with the corresponding main connector 40 and the coupling part 711 is embedded within the coupling recess 612 of the second shell 61, the second shell 61 and the third shell 71 are combined together and the power module 70 is assembled with the main circuit board 30. Consequently, the power module 70 can be assembled or replaced according to the practical requirements.

A process of assembling the combination type mouse 100 will be described as follows. Firstly, the supporting plate 10 is placed and fixed on the lower cover plate 20. Then, the main circuit board 30 is placed and fixed on the supporting plate 10. Then, the input module 50 is placed on a designated position of the main circuit board 30. After the first connector 55 of the input module 50 is inserted into the corresponding main connector 40, the input module 50 is fixed on the main circuit board 30. Then, the control module 60 is located beside the input module 50. After the second connector 63 of the control module 60 is inserted into the corresponding main connector 40 and the connecting part 611 of the second shell 61 is engaged with the connecting recess 511 of the first shell 51, the control module 60 is fixed on the main circuit board 30. Consequently, the control module 60 is connected with the input module 50. Then, the power module 70 is located beside the control module 60 and far away from the input module 50. After the third connector 73 of the power module 70 is inserted into the corresponding main connector 40 and the coupling part 711 of the third shell 71 is embedded within the coupling recess 612 of the second shell 61, the power module 70 is fixed on the main circuit board 30. Consequently, the power module 70 is connected with the control module 60. In such way, the input module 50, the control module 60 and the power module 70 can be assembled with the main circuit board 30 according to the practical requirements.

Moreover, the positions of the input module 50, the control module 60 and the power module 70 on the main circuit board 30 can be determined according to the preference or the use habit of the user. Consequently, the function of arbitrarily arranging the components can be achieved. Moreover, if the input module 50, the control module 60 or the power module 70 is damaged, the damaged component is detached from the main circuit board 30. Then, the damaged component (e.g., the input module 50, the control module 60 or the power module 70) can be replaced with a new one having new or noniial functions and the new component is installed on the main circuit board 30.

When the button 52 or the scroll wheel 53 is pressed by the user, the button sensor 56 or the encoder 57 receives an input signal from the user. The input signal is transmitted to the corresponding main connector 40 through the first connector 55. Then, the input signal is transmitted from the main connector 40 to the second connector 63 through the control module 60 and the corresponding main connector 40. Then, the input signal is transmitted from the second connector 63 to the controller 64 through the second circuit board 62. Moreover, the optical sensor 65 also receives a displacement signal of the combination type mouse 100. The displacement signal is transmitted to the controller 64 through the second circuit board 62. Consequently, the input signal and the displacement signal are transmitted from the controller 64 to a computer or a host. Moreover, the power-providing element 74 of the power module 70 provides electric energy to the input module 50 and the control module 60 through the third circuit board 72, the third connector 73, the main connector 40 corresponding to the third connector 73 and the main circuit board 30.

Figure 3:
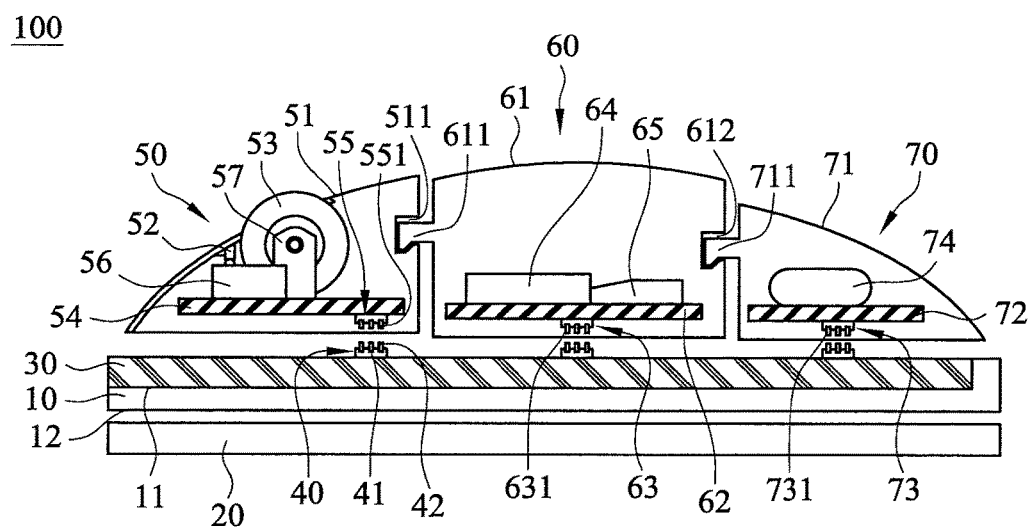
FIG. 3 is a schematic cross-sectional view illustrating the combination type mouse according to a second embodiment of the present invention.

FIG. 3 is a schematic cross-sectional view illustrating the combination type mouse according to a second embodiment of the present invention. In comparison with the above embodiment, the coupling structures of the first shell 51, the second shell 61 and the third shell 71 are distinguished. In this embodiment, the connecting recess 511 of the first shell 51 and the coupling recess 612 of the second shell 61 are locking recesses, and the connecting part 611 of the second shell 61 and the coupling part 711 of the third shell 71 are hooks. Due to the engagement between the connecting part 611 and the connecting recess 511, the second shell 61 and the first shell 51 are combined together. Due to the engagement between the coupling part 711 and the coupling recess 612, the third shell 71 and the second shell 61 are combined together.

Figure 4:
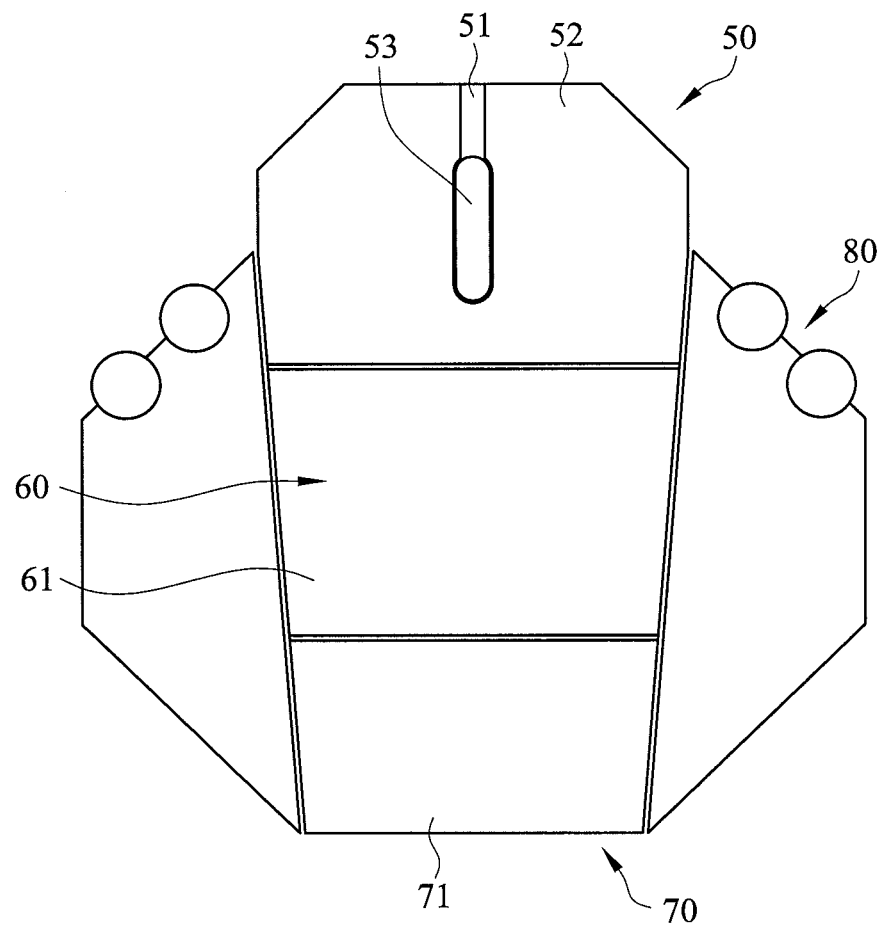
FIG. 4 is a schematic top view illustrating a combination type mouse according to a fourth embodiment of the present invention.

FIG. 4 is a schematic top view illustrating a combination type mouse according to a fourth embodiment of the present invention. In comparison with the above embodiments, the combination type mouse 100 further comprises at least one expansion module 80. The at least one expansion module 80 is assembled with the main circuit board 30 according to the requirement of the user.

From the above descriptions, the combination type mouse 100 of the present invention has many benefits. Firstly, the input module 50, the control module 60 and the power module 70 are assembled with and fixed on the main circuit board 30 through the connecting recess 511, the connecting part 611, the coupling recess 612, the coupling part 711, the first connector 55, the second connector 63, the third connector 73 and the plural main connectors 40. Consequently, the input module 50, the control module 60 and the power module 70 of the combination type mouse 100 can be combined with each other according to the practical requirements. Secondly, if the input module 50, the control module 60 or the power module 70 is damaged, the damaged component can be replaced with a new one having new or normal functions. Consequently, the maintenance process of the combination type mouse 100 is simplified. Thirdly, the combination type mouse 100 is additionally equipped with the expansion module 80. Consequently, the combination type mouse 100 has expanded functions.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:
1. A combination type mouse, comprising:
a supporting plate having an installation surface, wherein the installation surface is located at a top side of the supporting plate;
a lower cover plate, wherein a bottom side of the supporting plate has a connection surface, and the lower cover plate is connected with the connection surface of the supporting plate;
a main circuit board installed on the installation surface;
plural main connectors disposed on the main circuit board and electrically connected with the main circuit board;
an input module comprising a first connector and a connecting recess, wherein the first connector is electrically connected with a first main connector of the plural main connectors, wherein the input module comprises a first shell, wherein the connecting recess is formed in a surface of the first shell, the first connector is disposed within the first shell, the first connector comprises a first insertion terminal, and the first insertion terminal is inserted into and electrically connected with the first main connector;

a control module comprising a second connector and a connecting part, wherein the second connector is electrically connected with a second main connector of the plural main connectors, and the connecting part is connected with the connecting recess, wherein the control module comprises a second shell, wherein the connecting part is protruded externally from the second shell, the second connector is disposed within the second shell, the second connector comprises a second insertion terminal, and the second insertion terminal is inserted into and electrically connected with the second main connector; and a power module, comprising a third shell and a third connector, wherein the third shell is coupled with the second shell, the third connector is disposed within the third shell, the third connector comprises a third insertion terminal, and the third insertion terminal is inserted into and electrically connected with a third main connector of the plural main connectors;

wherein after the input module receives an input signal, the input signal is transmitted from the input module to the main circuit board through the first connector and the first main connector, and the input signal is further transmitted from the main circuit board to the control module through the second main connector and the second connector.

2. The combination type mouse according to claim 1, wherein the input module further comprises two buttons and a scroll wheel, wherein the two buttons and the scroll wheel are disposed on the first shell, and the scroll wheel is arranged between the two buttons.

3. The combination type mouse according to claim 2, wherein the input module further comprises a first circuit board, a button sensor and an encoder, which are disposed within the first shell, wherein the two buttons are connected with the button sensor, the scroll wheel is connected with the encoder, and the button sensor, the encoder and the first connector are electrically connected with the first circuit board.

4. The combination type mouse according to claim 3, wherein the button sensor, the encoder and the first connector are fixed on the first circuit board, wherein the button sensor and the encoder are located over the first circuit board, and the first connector is located under the first circuit board.

5. The combination type mouse according to claim 1, wherein the control module further comprises a second circuit board, a controller and an optical sensor, which are disposed within the second shell, wherein the second connector, the controller and the optical sensor are electrically connected with the second circuit board.

6. The combination type mouse according to claim 5, wherein the controller, the optical sensor and the second connector are fixed on the second circuit board, wherein the controller is located over the second circuit board, and the second connector is located under the second circuit board.

7. The combination type mouse according to claim 1, wherein the second shell further comprises a coupling recess, and the third shell comprises a coupling part, wherein the coupling part is protruded from the third shell, and the coupling part is engaged with the coupling recess.

8. The combination type mouse according to claim 7, wherein the power module further comprises a third circuit board and a power-providing element, which are disposed within the third shell, wherein the third connector and the power-providing element are electrically connected with the third circuit board.

9. The combination type mouse according to claim 8, wherein the third connector and the power-providing element are fixed on the third circuit board, wherein the power-providing element is located over the third circuit board, and the third connector is located under the third circuit board.

10. The combination type mouse according to claim 7, wherein the connecting part and the coupling part are protrusion blocks, the connecting recess and the coupling recess are indentations, and the protrusion blocks are engaged with the corresponding indentations.

11. The combination type mouse according to claim 7, wherein the connecting part and the coupling part are hooks, the connecting recess and the coupling recess are locking recesses, and the hooks are engaged with the corresponding locking recesses.

12. The combination type mouse according to claim 1, wherein the plural main connectors, the first connector, the second connector and the third connector are micro-clip connectors.

* * * * *